United States Patent
Osada

(10) Patent No.: US 12,131,751 B2
(45) Date of Patent: Oct. 29, 2024

(54) PACKAGE AND PACKAGING METHOD THAT FACILITATE PACKAGING WORK OF A MAGNETIC TAPE CARTRIDGE OR REMOVING WORK OF A PACKAGING MEMBER

(71) Applicant: FUJIFILM CORPORATION, Tokyo (JP)

(72) Inventor: Yoshihiko Osada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/180,150

(22) Filed: Mar. 8, 2023

(65) Prior Publication Data

US 2023/0298626 A1 Sep. 21, 2023

(30) Foreign Application Priority Data

Mar. 15, 2022 (JP) .................................. 2022-040672

(51) Int. Cl.
*G11B 23/04* (2006.01)
*G11B 15/68* (2006.01)
*G11B 23/107* (2006.01)

(52) U.S. Cl.
CPC ........ *G11B 23/045* (2013.01); *G11B 15/6825* (2013.01); *G11B 23/046* (2013.01); *G11B 23/107* (2013.01)

(58) Field of Classification Search
None
See application file for complete search history.

(56) References Cited

U.S. PATENT DOCUMENTS

| | | | | |
|---|---|---|---|---|
| 4,385,693 A | * | 5/1983 | Gelardi et al. | G11B 23/023 360/132 |
| 5,143,217 A | * | 9/1992 | Igarashi | G11B 23/0233 206/387.13 |
| 5,361,898 A | * | 11/1994 | Gottlieb | G11B 23/0233 206/387.1 |
| 5,725,169 A | * | 3/1998 | Odagiri | G11B 23/023 242/344 |
| 2005/0195517 A1 | * | 9/2005 | Brace et al. | G11B 15/6835 360/92.1 |
| 2005/0195518 A1 | * | 9/2005 | Starr et al. | G11B 15/6835 360/92.1 |
| 2005/0195519 A1 | * | 9/2005 | Kumpon et al. | G11B 15/6835 360/92.1 |
| 2005/0195520 A1 | * | 9/2005 | Starr et al. | G11B 15/6835 360/92.1 |

(Continued)

FOREIGN PATENT DOCUMENTS

| | | |
|---|---|---|
| JP | 2007-087475 A | 4/2007 |
| JP | 2010-092543 A | 4/2010 |
| JP | 2012-243346 A | 12/2012 |

*Primary Examiner* — Craig A. Renner
(74) *Attorney, Agent, or Firm* — SOLARIS Intellectual Property Group, PLLC

(57) ABSTRACT

A package includes a magnetic tape cartridge that has a case with an identifier displayed on a front surface, a storage member that has an opening portion, through which the magnetic tape cartridge is put in and out, and in which the magnetic tape cartridge is stored in a state in which the identifier is readable, and a packaging member that covers at least the opening portion of the storage member.

8 Claims, 12 Drawing Sheets

(56) References Cited

U.S. PATENT DOCUMENTS

| | | | |
|---|---|---|---|
| 2006/0161936 A1* | 7/2006 | Permut et al. | G11B 33/022 720/657 |
| 2011/0273801 A1* | 11/2011 | Sumiya | G11B 23/0236 360/132 |
| 2019/0295599 A1* | 9/2019 | Sumiya et al. | G11B 33/04 |
| 2019/0332911 A1* | 10/2019 | Kagawa | G11B 33/04 |

* cited by examiner

PACKAGE AND PACKAGING METHOD THAT FACILITATE PACKAGING WORK OF A MAGNETIC TAPE CARTRIDGE OR REMOVING WORK OF A PACKAGING MEMBER

CROSS-REFERENCE TO RELATED APPLICATION

This application claims priority from Japanese Patent Application No. 2022-040672, filed Mar. 15, 2022, the disclosure of which is incorporated herein by reference in its entirety.

BACKGROUND

Technical Field

A technique of the present disclosure relates to a package and a packaging method.

Related Art

JP2012-243346A discloses a media library device. The media library device has a magazine that accommodates a plurality of cartridges in each of which a storage medium is incorporated, a disk drive that loads the cartridge and reads and writes data from and to the storage medium, transport means including a transport unit that extracts a cartridge requested by a user from the magazine and transports the cartridge to the disk drive, and management means for operating in response to a request from the user to control the disk drive and the transport means. The cartridge has a barcode including an identification number of each cartridge attached to an exterior, and a cartridge memory that stores management information representing the content of the storage medium of each cartridge. The disk drive comprises a cartridge memory reading unit that reads the content of the cartridge memory in a case where the cartridge is loaded. In the media library device, the transport means comprises a barcode reading unit that reads the barcode, on the transport unit, the management means comprises a storage unit that stores the identification number read from the barcode and the management information read from the cartridge memory in association with each other, a media information management unit that searches for the management information corresponding to identification number newly read from the barcode, and an input/output unit that displays the searched management information on a display unit provided in advance and fetches a command input from the user, and the barcode reading unit is provided on a cartridge transport inlet on the transport unit.

JP2007-087475A discloses an accommodation management device of a cartridge for a photosensitive recording medium. The accommodation management device comprises a cartridge storage in which cartridges for a photosensitive recording medium with cartridge disk-shaped photosensitive recording mediums accommodated in a thin rectangular box-shaped cartridge main body are aligned and accommodated, RFID communication means, provided to be movable along an alignment direction of the cartridges for a photosensitive recording medium in the storage, for communicating with an RFID tag provided at a predetermined position of each cartridge for a photosensitive recording medium, a control device that controls a communication operation of the RFID communication means and a movement operation in the alignment direction of the cartridges for a photosensitive recording medium to collect identification information given to the RFID tag of each cartridge for a photosensitive recording medium accommodated in the cartridge storage, and a display device that displays the identification information collected by the control device, and the like.

JP2010-092543A discloses a media library device. The media library device comprises a media storage portion that stores a plurality of media for recording data, a media drive that performs data recording and reproduction of the media stored in the media storage portion, a robot hand that moves between the media storage portion and the media drive to transport the media, a table that holds the robot hand, a robot control unit that controls the operation of the robot hand the table, and a housing that stores the media storage portion, the media drive, the table, and the robot control unit, and is wholly or partially transparent.

SUMMARY

An embodiment according to the technique of the present disclosure provides a package and a packaging method that facilitate packaging work of a magnetic tape cartridge or removing work of a packaging member, compared to a case where a magnetic tape cartridge is packaged separately.

A first aspect according to the technique of the present disclosure is a package comprising a magnetic tape cartridge that has a case with an identifier displayed on a front surface, a storage member that has an opening portion, through which the magnetic tape cartridge is put in and out, and in which the magnetic tape cartridge is stored in a state in which the identifier is readable, and a packaging member that covers at least the opening portion of the storage member.

A second aspect according to the technique of the present disclosure is the package according to the first aspect, in which the packaging member is a film-shaped member formed in a film shape.

A third aspect according to the technique of the present disclosure is the package according to the first aspect, in which the packaging member is a lid-shaped member formed to be attachable and detachable with respect to the storage member.

A fourth aspect according to the technique of the present disclosure is the package according to any one of the first aspect to the third aspect, in which the packaging member covers the storage member in a state in which the identifier is readable.

A fifth aspect according to the technique of the present disclosure is the package according to the fourth aspect, in which the packaging member is formed of a material that transmits visible light.

A sixth aspect according to the technique of the present disclosure is the package according to any one of the first aspect to the fifth aspect, in which the storage member is a magazine for a magnetic tape cartridge formed to be inputtable into a magnetic tape library.

A seventh aspect according to the technique of the present disclosure is the package according to any one of the first aspect to the sixth aspect, in which the package comprises a plurality of the magnetic tape cartridges, and the storage member has a plurality of storage portions that store the plurality of the magnetic tape cartridges, respectively.

An eighth aspect according to the technique of the present disclosure is the package according to any one of the first aspect to the seventh aspect, in which the identifier is displayed on a surface of the case on an opening portion side.

A ninth aspect according to the technique of the present disclosure is the package according to any one of the first aspect to the eighth aspect, in which the identifier includes a one-dimensional image and/or a two-dimensional matrix image.

A tenth aspect according to the technique of the present disclosure is the package according to any one of the first aspect to the ninth aspect, in which the storage member has a first surface where the opening portion is formed, and a second surface that is adjacent to the first surface and where a gripping portion is provided.

An eleventh aspect according to the technique of the present disclosure is a packaging method comprising inserting a magnetic tape cartridge having a case with an identifier displayed on a front surface, from an opening portion, to store the magnetic tape cartridge in a storage member in a state in which the identifier is readable, and covering at least the opening portion of the storage member with a packaging member.

DETILED DESCRIPTION

First, terms that are used in the following description will be described.

CPU is an abbreviation for "Central Processing Unit". RAM is an abbreviation for "Random Access Memory". ROM is an abbreviation for "Read Only Memory". ASIC is an abbreviation for "Application Specific Integrated Circuit". PLD is an abbreviation for "Programmable Logic Device". FPGA is an abbreviation for "Field-Programmable Gate Array".

In the following description, for convenience of description, in FIG. 1, an arrow A direction is referred to as a front direction of a magnetic tape cartridge 10, and a side in the front direction of the magnetic tape cartridge 10 is referred to as a front side of the magnetic tape cartridge 10. In the following description on the structure of the magnetic tape cartridge 10, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description on the structure of the magnetic tape cartridge 10, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an up direction of the magnetic tape cartridge 10, and a side in the up direction of the magnetic tape cartridge 10 is referred to as an upside of the magnetic tape cartridge 10. In the following description on the structure of the magnetic tape cartridge 10, "up" indicates the upside of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description on the structure of the magnetic tape cartridge 10, "rear" indicates the rear side of the magnetic tape cartridge 10.

In the following description, for convenience of description, in FIG. 1, a direction opposite to the up direction of the magnetic tape cartridge 10 is referred to as a down direction of the magnetic tape cartridge 10, and a side in the down direction of the magnetic tape cartridge 10 is referred to as a downside of the magnetic tape cartridge 10. In the following description on the structure of the magnetic tape cartridge 10, "down" indicates the downside of the magnetic tape cartridge 10.

Figure 1:
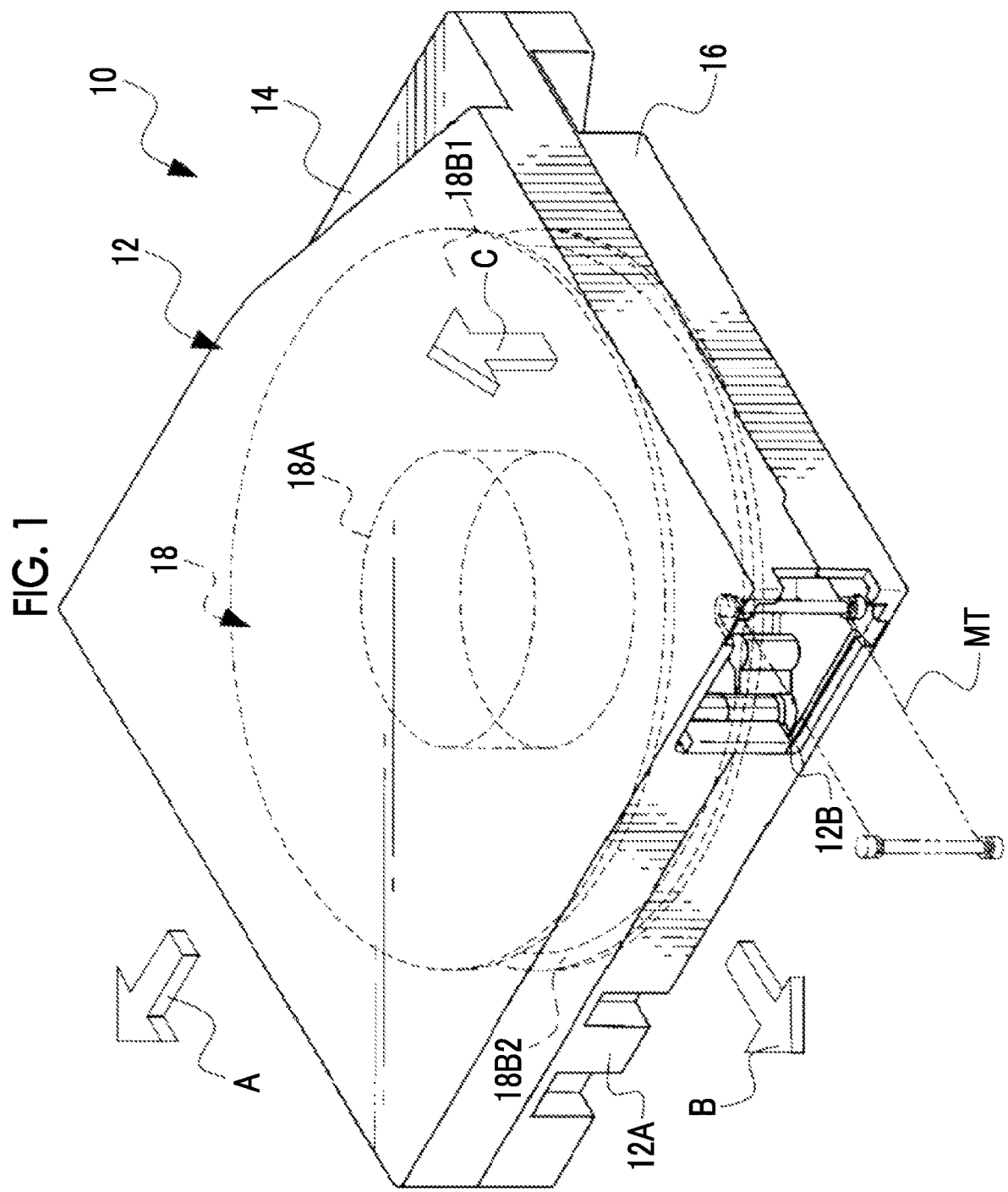
FIG. 1 is a schematic perspective view showing an example of the appearance of a magnetic tape cartridge according to an embodiment.

As shown in FIG. 1 as an example, the magnetic tape cartridge 10 has a substantially rectangular shape in plan view, and comprises a box-shaped case 12. The magnetic tape cartridge 10 is an example of a "magnetic tape cartridge" according to the technique of the present disclosure. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used. The case 12 is an example of a "case" according to the technique of the present disclosure.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2. The reel hub 18A and the lower flange 18B2 may be molded integrally.

An opening 12B is formed on a rear side of a right wall 12A of the case 12. The magnetic tape MT is pulled out from the opening 12B.

Figure 2:
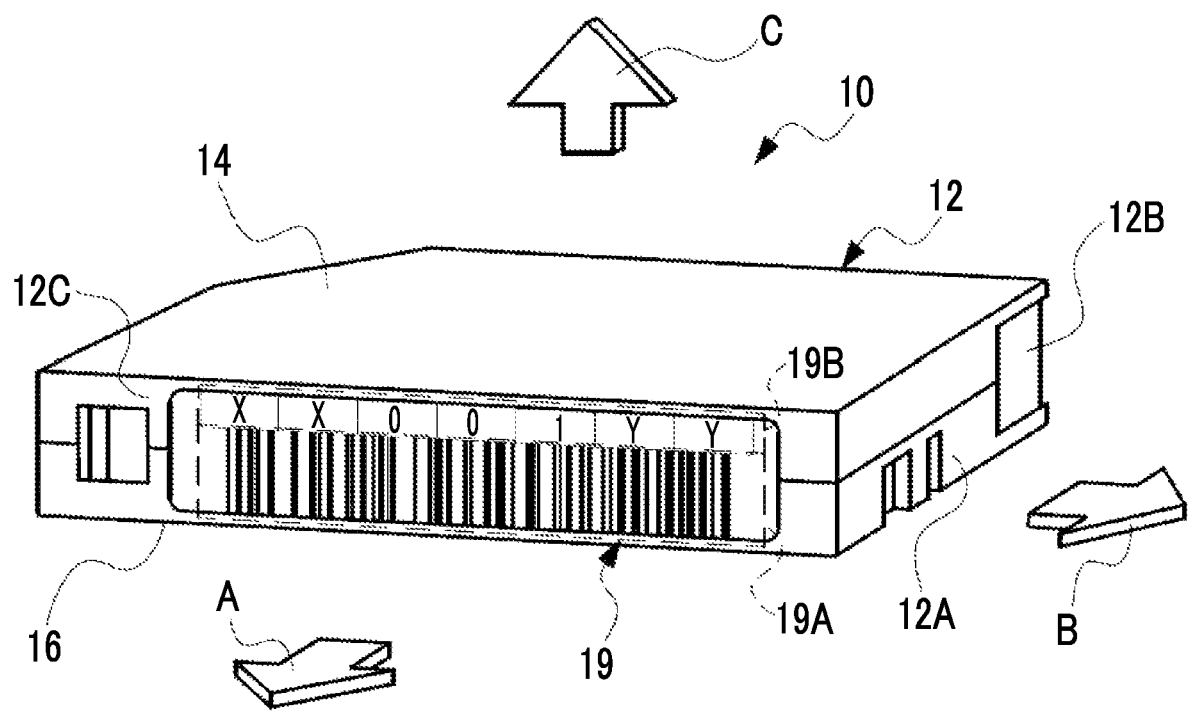
FIG. 2 is a schematic perspective view showing an example of an identifier displayed on the magnetic tape cartridge according to the embodiment.

As shown in FIG. 2 as an example, an identifier 19 is displayed on a surface of the case 12 of the magnetic tape cartridge 10. In the example shown in FIG. 2, the identifier 19 is displayed on a surface of a front wall 12C of the case 12. The identifier 19 includes a barcode 19A. The barcode 19A is a one-dimensional image indicating information for identifying the magnetic tape cartridge 10 (for example, a serial number for managing the magnetic tape cartridge 10, given by a user). The identifier 19 is an example of an "identifier" according to the technique of the present disclosure, and the barcode 19A is an example of a "one-dimensional image" according to the technique of the present disclosure.

In the example shown in FIG. 2, the identifier 19 includes a character string 19B. The character string 19B is a character string (for example, a character string including a combination of alphanumeric characters) indicating information for identifying the magnetic tape cartridge 10. The character string 19B is displayed, so that the user can visually identify the magnetic tape cartridge 10.

Although the identifier 19 is displayed on the case 12, for example, in such a manner that a label on which the barcode 19A and the character string 19B are printed is attached to the surface of the case 12, this is merely an example. The identifier 19 may be printed directly on the surface of the case 12.

Figure 3:
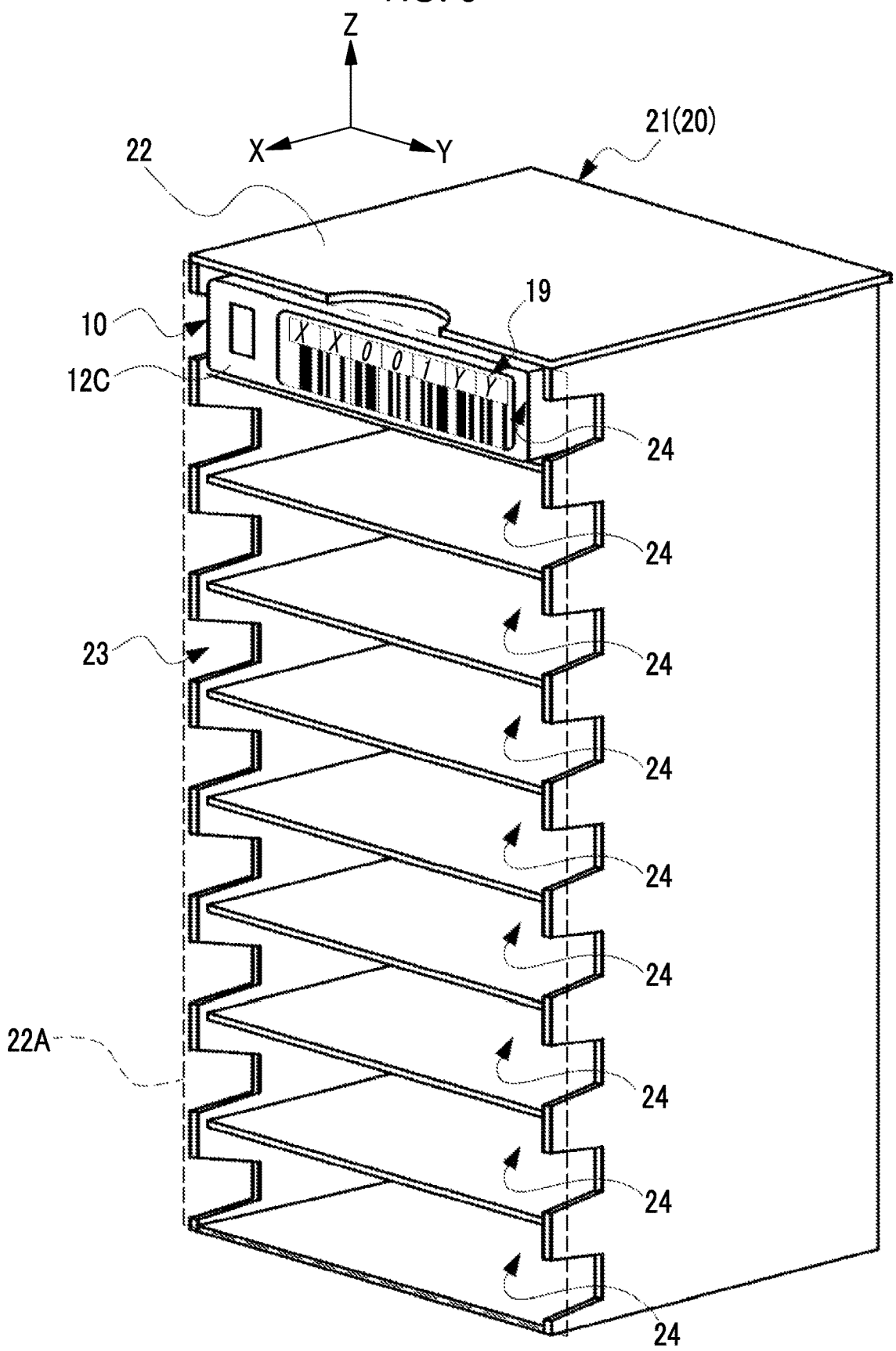
FIG. 3 is a schematic perspective view showing an example of the appearance of a cartridge magazine according to the embodiment.

As shown in FIG. 3 as an example, the magnetic tape cartridge 10 is stored in a storage member 20. The storage member 20 is, for example, a cartridge magazine 21. The storage member 20 is an example of a "storage member" according to the technique of the present disclosure, and the cartridge magazine 21 is an example of a "magazine for a magnetic tape cartridge" according to the technique of the present disclosure.

In the following description, for convenience of description, in FIG. 3, an arrow X direction is referred to as a front direction of the cartridge magazine 21, and a side in the front direction of the cartridge magazine 21 is referred to as a front side of the cartridge magazine 21. In the following description on the structure of the cartridge magazine 21, "front" indicates the front side of the cartridge magazine 21.

In the following description, for convenience of description, in FIG. 3, an arrow Y direction perpendicular to the arrow X direction is referred to as a right direction, and a side in the right direction of the cartridge magazine 21 is referred to as a right side of the cartridge magazine 21. In the following description on the structure of the cartridge magazine 21, "right" indicates the right side of the cartridge magazine 21.

In the following description, for convenience of description, in FIG. 3, a direction perpendicular to the arrow X direction and the arrow Y direction is indicated by an arrow Z, an arrow Z direction is referred to as an up direction of the cartridge magazine 21, and a side in the up direction of the cartridge magazine 21 is referred to as an upside of the cartridge magazine 21. In the following description on the structure of the cartridge magazine 21, "up" indicates the upside of the cartridge magazine 21.

The cartridge magazine 21 has a housing structure 22 configured to be able to house the magnetic tape cartridge 10 inside. The cartridge magazine 21 has an opening portion 23. The opening portion 23 is an example of an "opening portion" according to the technique of the present disclosure.

The opening portion 23 is formed in such a manner that one surface in the housing structure 22 of the cartridge magazine 21 is opened to the outside. In the example shown in FIG. 3, the opening portion 23 is formed in a front surface 22A in the housing structure 22. The magnetic tape cartridge 10 is put in and out with respect to the cartridge magazine 21 through the opening portion 23. Although the housing structure 22 is formed of, for example, resin, this is merely an example, and the housing structure 22 is formed of, for example, metal.

The magnetic tape cartridge 10 is stored in the cartridge magazine 21 in a state in which the identifier 19 is readable. The identifier 19 is displayed on a surface of the case 12 on the side of the opening portion 23. Here, the surface of the case 12 on the side of the opening portion 23 indicates a surface that is exposed to the outside of the cartridge magazine 21 through the opening portion 23.

In the example shown in FIG. 3, the magnetic tape cartridge 10 is stored in a state in which the front wall 12C on which the identifier 19 is displayed is exposed to the outside of the cartridge magazine 21. More specifically, the identifier 19 is displayed on the surface of the front wall 12C that is the surface on the side of the opening portion 23, in the case 12. The magnetic tape cartridge 10 is stored in the cartridge magazine 21 that the front wall 12C turns toward the side of the opening portion 23.

The cartridge magazine 21 has a plurality of storage portions 24 (that is, cavities). A plurality of storage portions 24 are formed in such a manner that the inside of the cartridge magazine 21 is partitioned into a plurality of portions. In the example shown in FIG. 3, the cartridge magazine 21 having a rectangular parallelepiped shape is partitioned into nine stages along an up-down direction (that is, a Z-axis direction), whereby nine storage portions 24 are formed. The storage portion 24 is an example of a "storage portion" according to the technique of the present disclosure.

Figure 4:
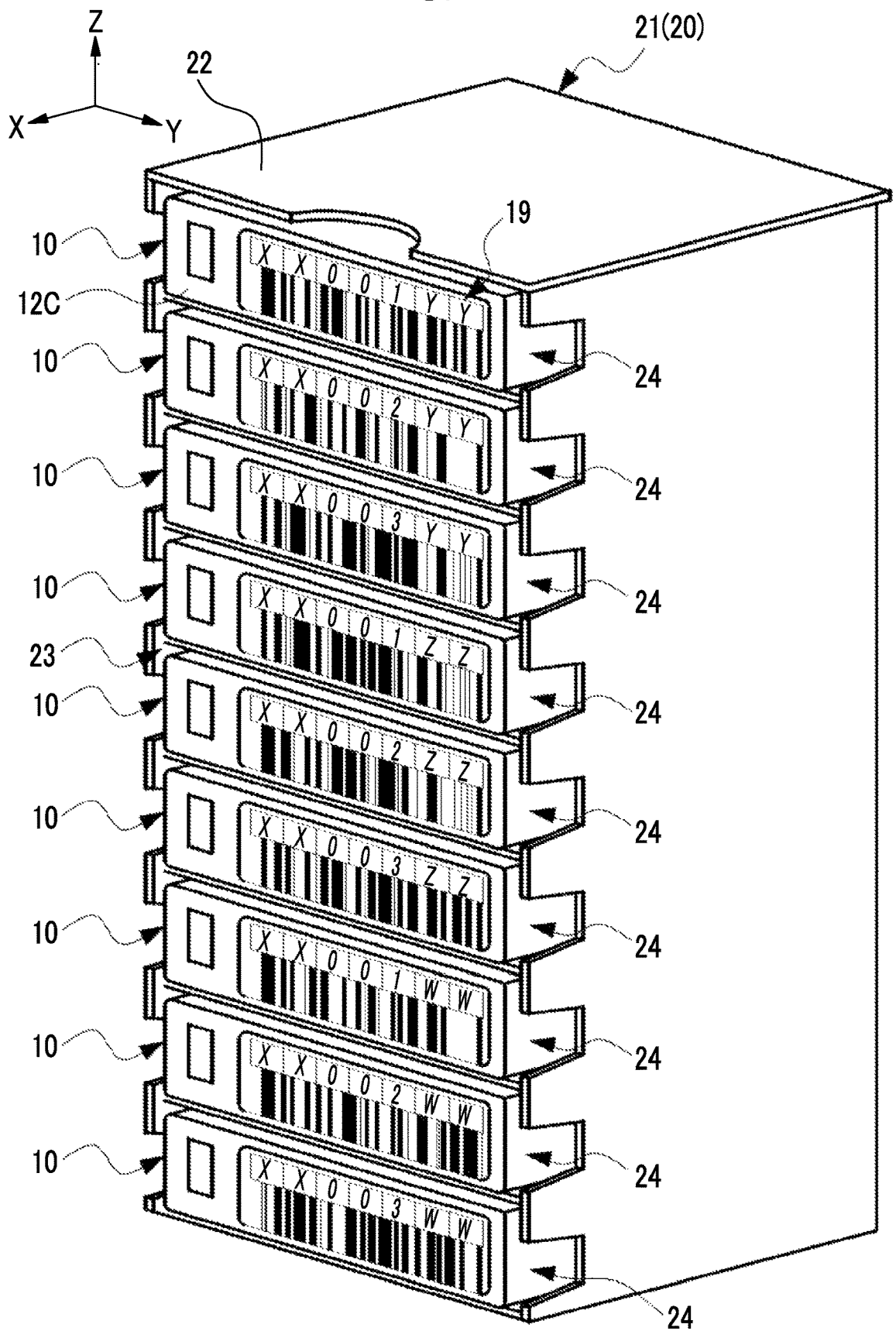
FIG. 4 is a schematic perspective view showing an example of the appearance of the cartridge magazine according to the embodiment.

As shown in FIG. 4 as an example, the cartridge magazine 21 is able to store a plurality of magnetic tape cartridges 10. In the example shown in FIG. 4, nine magnetic tape cartridges 10 are stored with respect to the nine storage portions 24.

The cartridge magazine 21 is input into a magnetic tape library 70 (see FIG. 6) in a state in which a plurality of magnetic tape cartridges 10 are stored. With this, a plurality of magnetic tape cartridges 10 can be input into the magnetic tape library 70 at one time.

By the way, in a case of shipping and transporting the magnetic tape cartridge 10, it is necessary to protect the magnetic tape cartridge 10 against an impact, dirt, and the like. For this reason, the magnetic tape cartridges 10 are packaged one by one. In this case, in a case of loading a plurality of magnetic tape cartridges 10 into the magnetic tape library 70 at one time using the cartridge magazine 21, first, work of removing packaging materials of the plurality of magnetic tape cartridges 10 is required. Then, the magnetic tape cartridges 10 with the packaging materials removed are stored in the cartridge magazine 21. In this way, in a case of packaging a plurality of magnetic tape cartridges 10 one by one, packaging work and removing work of the packaging material are complicated.

Figure 5:
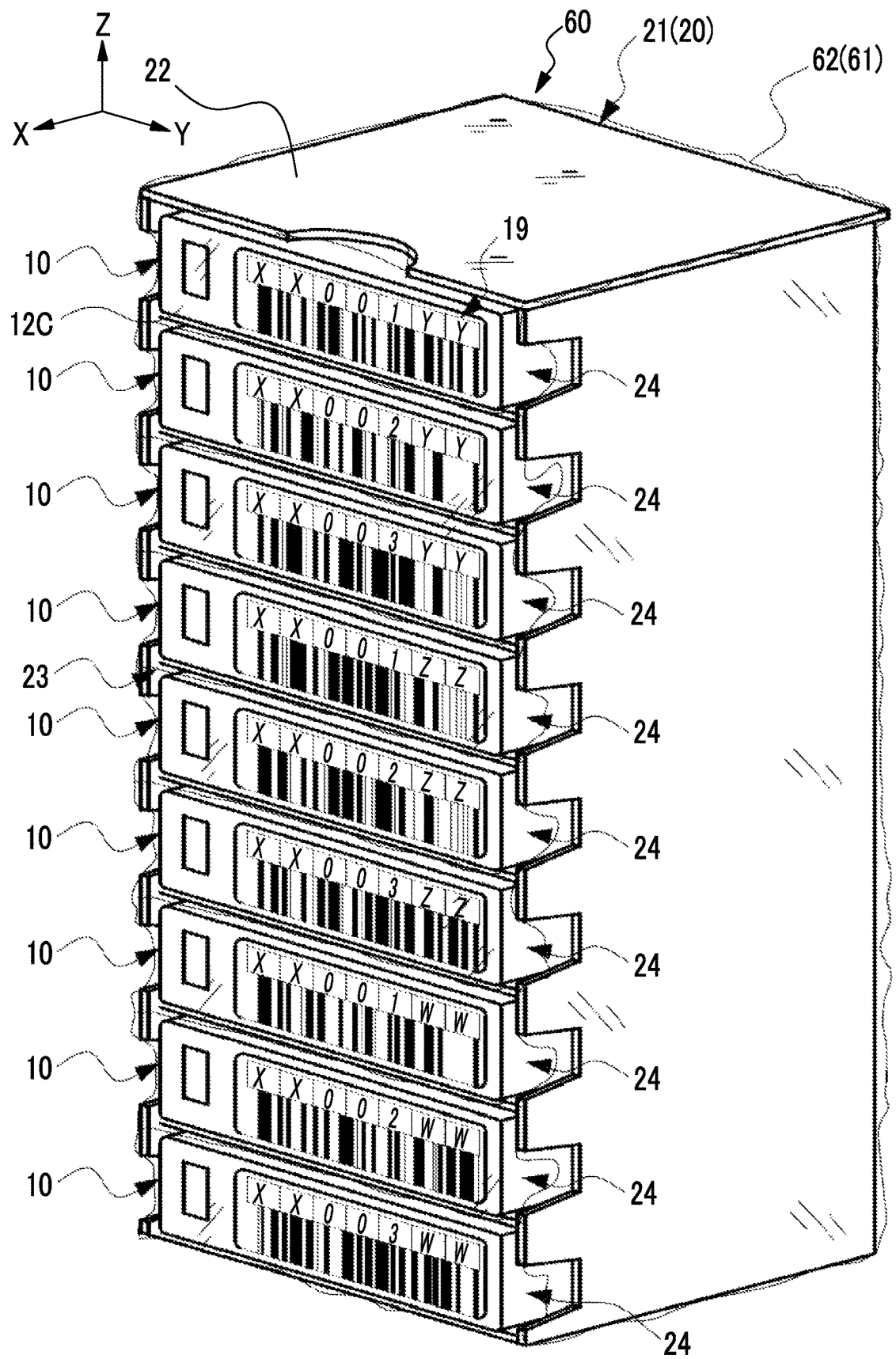
FIG. 5 is a schematic perspective view showing an example of the appearance of a package according to the embodiment.

Accordingly, in view of such a situation, in the present embodiment, as shown in FIG. 5 as an example, a package 60 is used. The package 60 comprises a storage member 20, and a packaging member 61 that covers at least an opening portion 23 of the storage member 20. The package 60 is an example of a "package" according to the technique of the present disclosure.

As described above, the storage member 20 is, for example, the cartridge magazine 21. In the cartridge magazine 21, the magnetic tape cartridge 10 is stored in a state in which the identifier 19 is readable.

The packaging member 61 covers the cartridge magazine 21, thereby absorbing an impact or suppressing dropping-out of the magnetic tape cartridge 10. The packaging member 61 is a film-shaped member 62 formed in a film shape. In the example shown in FIG. 5, although the film-shaped member 62 covers the whole of the cartridge magazine 21, this is merely an example. The film-shaped member 62 may cover at least the opening portion 23, and for example, an aspect where the film-shaped member 62 covers only the front surface 22A of the cartridge magazine 21 may be made. The packaging member 61 is an example of a "packaging member" according to the technique of the present disclosure, and the film-shaped member 62 is an example of a "film-shaped member" according to the technique of the present disclosure.

The film-shaped member 62 contracts in a state of covering the whole of the cartridge magazine 21, for example. With this, the film-shaped member 62 is closely attached to the cartridge magazine 21. As a result, dropping out of the magnetic tape cartridge 10 from dropping out from the cartridge magazine 21 is suppressed. Although an example of an aspect where the film-shaped member 62 is closely attached to the cartridge magazine 21 is thermal contraction, this is merely an example. For example, the film-shaped member 62 may be put around the cartridge magazine 21 to be closely attached to the cartridge magazine 21.

The film-shaped member 62 covers the cartridge magazine 21 in a state in which the identifier 19 is readable. The film-shaped member 62 is formed of a material that transmits visible light. For example, the film-shaped member 62 is a film formed of polyethylene. A thickness and a physical property (for example, stretchability) of the film-shaped member 62 may be appropriately set within a scope without departing from the object of the technique of the present disclosure, and are not particularly limited.

Figure 6:
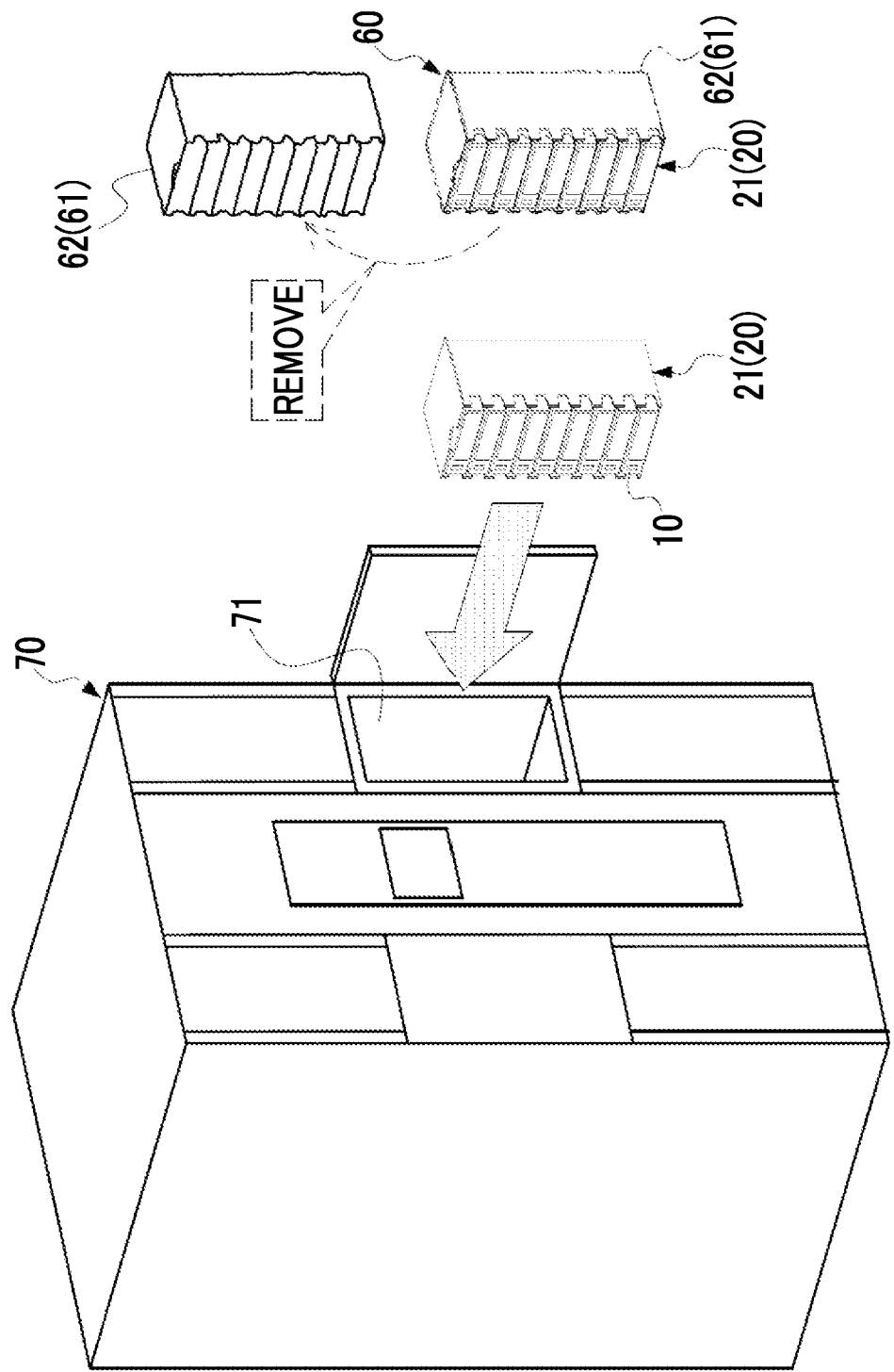
FIG. 6 is a schematic view showing an example of a manner in which the cartridge magazine according to the embodiment is input into a magnetic tape library.

As shown in FIG. 6 as an example, in a case of inputting the cartridge magazine 21 into the magnetic tape library 70, first, the magnetic tape cartridge 10 included in the package 60 is identified. The magnetic tape cartridge 10 is stored in the cartridge magazine 21 in a state in which the identifier 19 is readable. The packaging member 61 covers the cartridge magazine 21 in a state in which the identifier 19 is readable. With this, even before the packaging member 61 is removed, the magnetic tape cartridge 10 can be identified.

For example, the user reads the barcode 19A included in the identifier 19 using a barcode reader to identify the magnetic tape cartridge 10 included in the package 60. For example, the user visually identifies the magnetic tape cartridge 10 included in the package 60 based on the character string 19B included in the identifier 19.

After the magnetic tape cartridge 10 is identified, the film-shaped member 62 as the packaging member 61 is removed in the package 60. Thereafter, the cartridge magazine 21 is input into the magnetic tape library 70 through an input port 71. The magnetic tape library 70 is an example of a magnetic tape library" according to the technique of the present disclosure.

Figure 7:
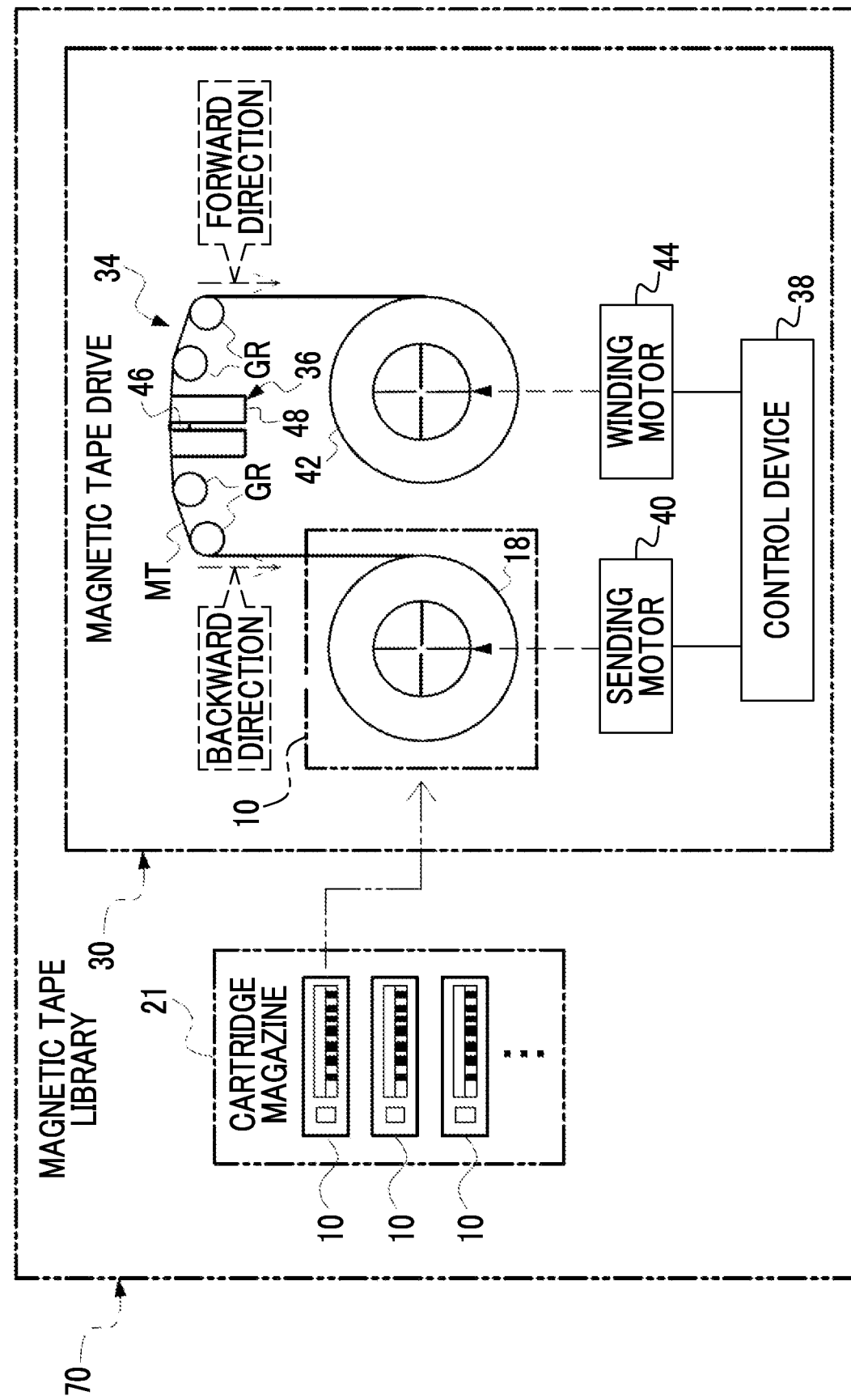
FIG. 7 is a schematic configuration diagram showing an example of the hardware configuration of a magnetic tape library according to the embodiment.

As shown in FIG. 7 as an example, a magnetic tape drive 30 is provided in the magnetic tape library 70. The magnetic tape cartridge 10 is pulled out from the cartridge magazine 21 and is loaded into the magnetic tape drive 30. The identifier 19 of the magnetic tape cartridge 10 is read by a reading device (not shown), so that the magnetic tape cartridge 10 that is loaded into the magnetic tape drive 30 is identified.

The magnetic tape drive 30 comprises a transport device 34, a reading and writing head 36, and a control device 38. The magnetic tape cartridge 10 is loaded into the magnetic tape drive 30. The magnetic tape drive 30 is a device that pulls out the magnetic tape MT from the magnetic tape cartridge 10, and reads and writes information from and to the pulled-out magnetic tape MT using the reading and writing head 36 by a linear serpentine method. In the present embodiment, reading and writing of information indicate, in other words, recording and reproduction of information.

The control device 38 controls the entire magnetic tape drive 30. In the present embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an ASIC, an FPGA, a PLD, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, and a plurality of guide rollers GR.

The sending motor 40 rotationally drives the cartridge reel 18 in the magnetic tape cartridge 10 under the control of the control device 38. The control device 38 controls the sending motor 40 to control a rotation direction, a rotation speed, rotation torque, and the like of the cartridge reel 18.

The winding motor 44 rotationally drives the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the sending motor 40 and the winding motor 44 are rotated by the control device 38 such that the magnetic tape MT runs in the forward direction. In a case where the magnetic tape MT is rewound to the cartridge reel 18, the sending motor 40 and the winding motor 44 are rotated by the control device 38 such that the magnetic tape MT runs in the backward direction. Rotation speeds, rotation torque, and the like of the sending motor 40 and the winding motor 44 are adjusted depending on a speed of the magnetic tape MT wound around the winding reel 42.

Each of a plurality of guide rollers GR is a roller that guides the magnetic tape MT. A running path of the magnetic tape MT is determined by separately disposing a plurality of guide rollers GR at positions straddling over the reading and writing head 36 between the magnetic tape cartridge 10 and the winding reel 42.

The reading and writing head 36 comprises a reading and writing element 46 and a holder 48. The reading and writing element 46 is held by the holder 48 to come into contact with the running magnetic tape MT. The reading and writing element 46 reads information from the magnetic tape MT or records information on the magnetic tape MT.

Figure 8:
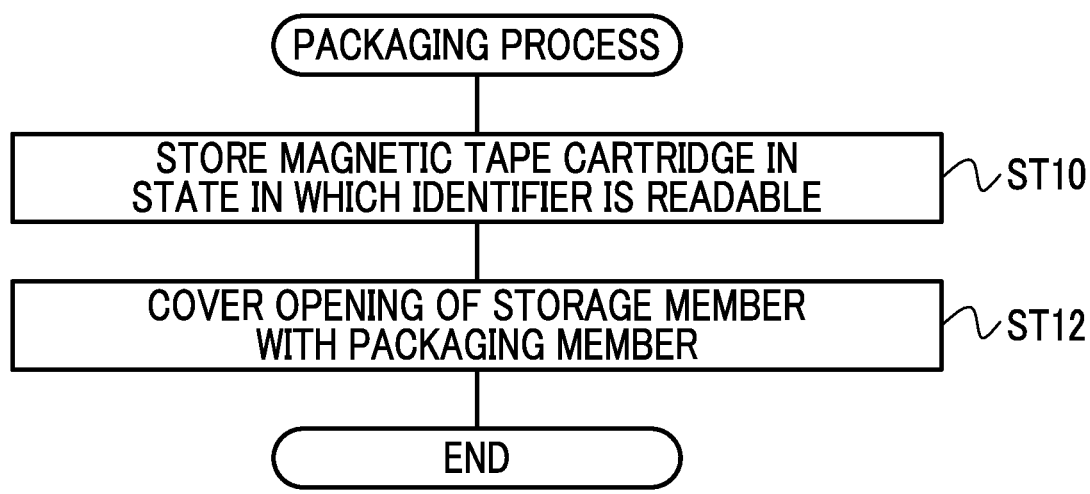
FIG. 8 is a flowchart illustrating an example of a packaging process according to the embodiment.

Next, a packaging process of the present embodiment will be described referring to FIG. 8. FIG. 8 shows an example of the packaging process of the present embodiment. The packaging process shown in FIG. 8 is an example of a "packaging method" according to the technique of the present disclosure.

In the packaging process shown in FIG. 8 as an example, first, in Step ST10, the magnetic tape cartridge 10 is stored in the cartridge magazine 21 in a state in which the identifier 19 is readable. Thereafter, the packaging process proceeds to Step ST12.

in Step ST12, at least the opening portion 23 of the cartridge magazine 21 is covered with the packaging member 61. With this, the packaging process ends.

As described above, in the package 60 according to the present embodiment, the magnetic tape cartridge 10 is stored in the storage member 20, and is in a state in which the identifier 19 displayed on the front wall 12C of the magnetic tape cartridge 10 is readable. The packaging member 61 covers at least the opening portion 23 of the storage member 20. Therefore, according to this configuration, packaging work or the magnetic tape cartridge 10 or removing work of the packaging member is facilitated. For example, according to this configuration, packaging work of the magnetic tape cartridge 10 or removing work of the packaging member 61 is facilitated, compared to a case where a plurality of magnetic tape cartridges 10 are packaged separately.

In the package 60 according to the present embodiment, the packaging member 61 is the film-shaped member 62. Therefore, according to this configuration, a configuration in which the storage members 20 having various shapes are packaged by the film-shaped member 62 is realized. For example, according to this configuration, a configuration in which the storage members 20 having various shapes are packaged is realized, compared to a case where the packaging member 61 is a member having a given shape.

In the package 60 according to the present embodiment, the packaging member 61 covers the storage member 20 in a state in which the identifier 19 is readable. Therefore, according to this configuration, the magnetic tape cartridge 10 is easily identified even in a state of being covered with the packaging member 61. For example, compared to a case where the identifier 19 is not read through the packaging member 61, the magnetic tape cartridge 10 is easily identified even in a state of being covered with the packaging member 61.

In the package 60 according to the present embodiment, the packaging member 61 is formed of a material that transmits visible light. Therefore, according to this configuration, the magnetic tape cartridge 10 can be visually identified.

In the package 60 according to the present embodiment, the storage member 20 is the cartridge magazine 21. Therefore, according to this configuration, a configuration in which the cartridge magazine 21 as the storage member 20 is input into the magnetic tape library 70 directly is realized.

In the package 60 according to the present embodiment, the storage member 20 has a plurality of storage portions 24 that store a plurality of magnetic tape cartridges 10, respectively. Therefore, according to this configuration, even in a case of storing a plurality of magnetic tape cartridges 10 in the storage portions 24, packaging work of a plurality of magnetic tape cartridges 10 or removing work of the packaging member 61 is facilitated. For example, compared to a case where a plurality of magnetic tape cartridges 10 are packaged separately, packaging work of a plurality of magnetic tape cartridges 10 or removing work of the packaging member 61 is facilitated.

In the package 60 according to the present embodiment, the identifier 19 is displayed on the surface in the case 12 of the magnetic tape cartridge 10 on the side of the opening portion 23 in the storage member 20. Therefore, according to this configuration, the magnetic tape cartridge 10 stored in the storage member 20 is easily identified. For example, the magnetic tape cartridge 10 stored in the storage member 20 is easily identified, compared to a case where an opening for exposing the identifier 19 other than the opening portion 23 in the storage member 20 is provided.

In the package 60 according to the present embodiment, the identifier 19 includes the barcode 19A. Therefore, according to this configuration, the magnetic tape cartridge 10 is easily identified. For example, the magnetic tape cartridge 10 is easily identified, compared to a case where the identifier 19 is composed only of a character string.

Modification Example 1

In the above-described embodiment, although a form example where the packaging member 61 is the film-shaped member 62 has been described, the technique of the present disclosure is not limited thereto. In Modification Example 1, the packaging member 61 is a lid-shaped member 63. The lid-shaped member 63 is an example of a "lid-shaped member" according to the technique of the present disclosure.

Figure 9:
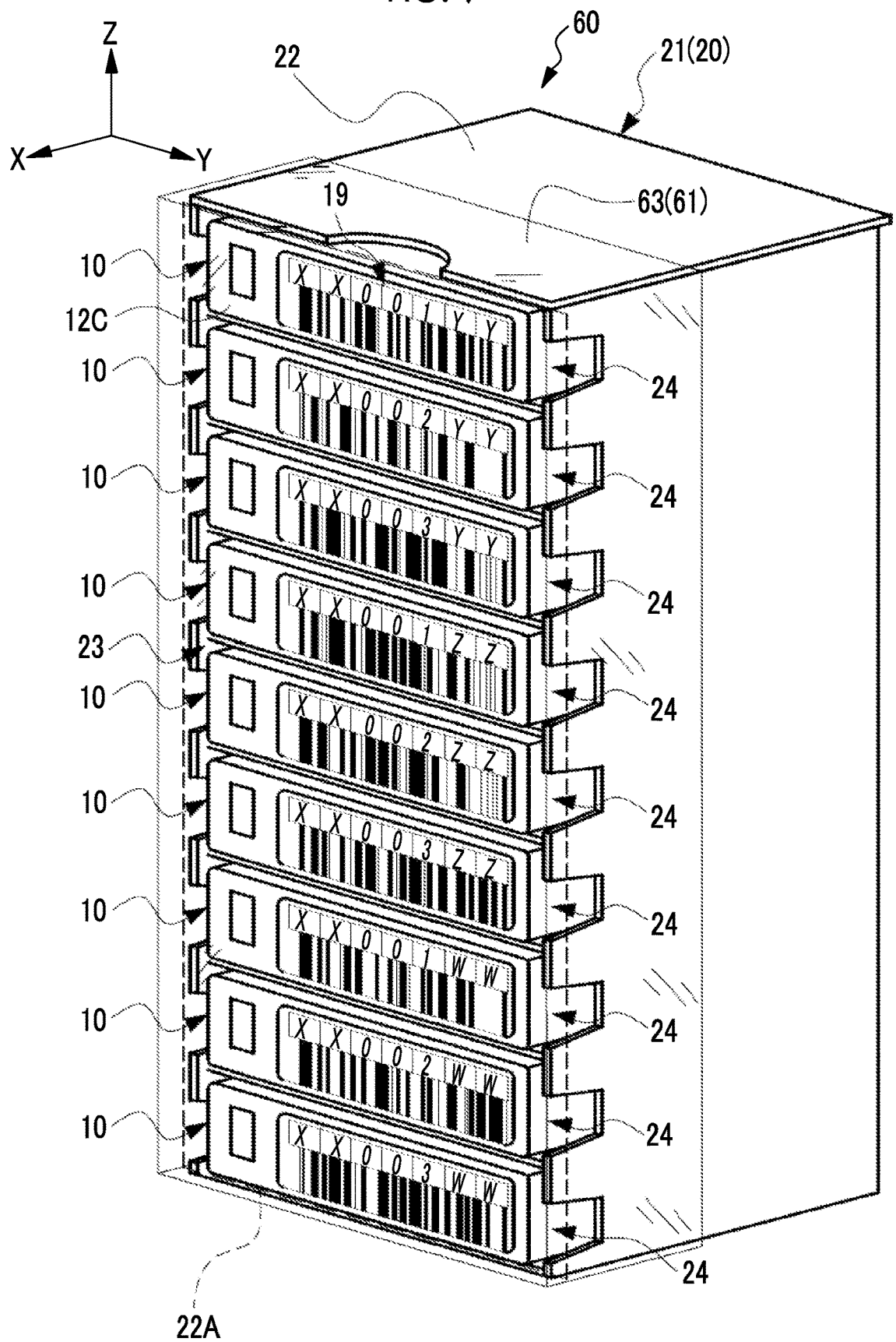
FIG. 9 is a schematic perspective view showing an example of the appearance of a package according to a modification example.

As shown in FIG. 9 as an example, the package 60 comprises the lid-shaped member 63 as the packaging member 61. The lid-shaped member 63 is formed to be attachable and detachable with respect to the storage member 20. The lid-shaped member 63 is attached to the front surface 22A of the storage member 20, thereby covering the opening portion 23. In the example shown in FIG. 9, the lid-shaped member 63 is put from the front surface 22A side of the storage member 20. With this, dropping-out of the magnetic tape cartridge 10 from the storage member 20 is suppressed.

The lid-shaped member 63 covers the cartridge magazine 21 in a state in which the identifier 19 is readable. The lid-shaped member 63 is formed of a material that transmits visible light. For example, although the lid-shaped member 63 is formed of acrylic resin, this is merely an example, and a material of the lid-shaped member 63 is selected in consideration of strength and processability required for the lid-shaped member 63. A thickness and a shape of the lid-shaped member 63 may be appropriately set within a scope without departing from the object of the technique of the present disclosure, and are not particularly limited.

In a case of removing the packaging of the magnetic tape cartridge 10, the lid-shaped member 63 as the packaging member 61 is detached in the package 60. Thereafter, the cartridge magazine 21 is input into the magnetic tape library 70 (see FIG. 6) through the input port 71 (see FIG. 6).

As described above, in the package 60 according to the present modification example, the packaging member 61 is the lid-shaped member 63. Therefore, according to this configuration, packaging work of the magnetic tape cartridge 10 or removing work of the packaging member 61 is facilitated. For example, packaging work of the magnetic tape cartridge 10 or removing work of the packaging member 61 is facilitated, compared to a case where the packaging member 61 is processed each time of packaging work or a range to be covered with the packaging member 61 is adjusted.

Modification Example 2

In the above-described embodiment, although a case where the packaging member 61 is composed only of the film-shaped member 62 has been described, the technique of the present disclosure is not limited thereto. In Modification Example 2, the film-shaped member 62 and the lid-shaped member 63 are used as the packaging member 61.

Figure 10:
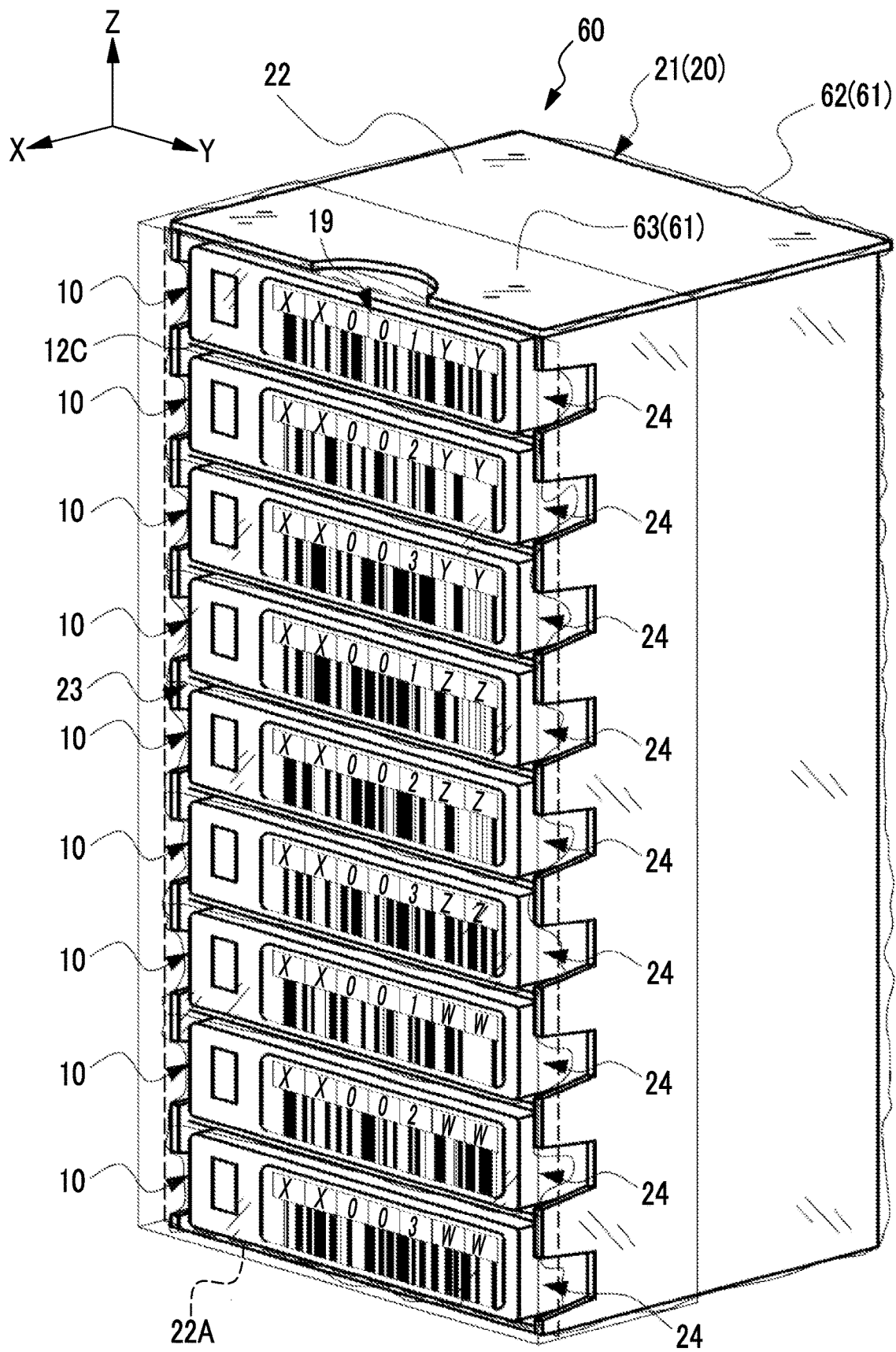
FIG. 10 is a schematic perspective view showing an example of the appearance of a package according to a modification example.

As shown in FIG. 10 as an example, the package 60 comprises the film-shaped member 62 and the lid-shaped member 63 as the packaging member 61. In the example shown in FIG. 10, the storage member 20 is wholly covered with the film-shaped member 62. In addition, the lid-shaped member 63 is put from the front surface 22A side of the storage member 20.

As described above, in the package 60 according to the present modification example, the packaging member 61 is the film-shaped member 62 and the lid-shaped member 63. Therefore, according to this configuration, packaging work or the magnetic tape cartridge 10 or removing work of the packaging member is facilitated. For example, according to this configuration, packaging work of the magnetic tape cartridge 10 or removing work of the packaging member 61 is facilitated, compared to a case where a plurality of magnetic tape cartridges 10 are packaged separately.

Modification Example 3

In the above-described embodiment, although a form example where the storage member 20 has the housing structure 22, the technique of the present disclosure is not limited thereto. In Modification Example 3, the storage member 20 has a gripping portion 25 (that is, a grip) provided in the housing structure 22.

Figure 11:
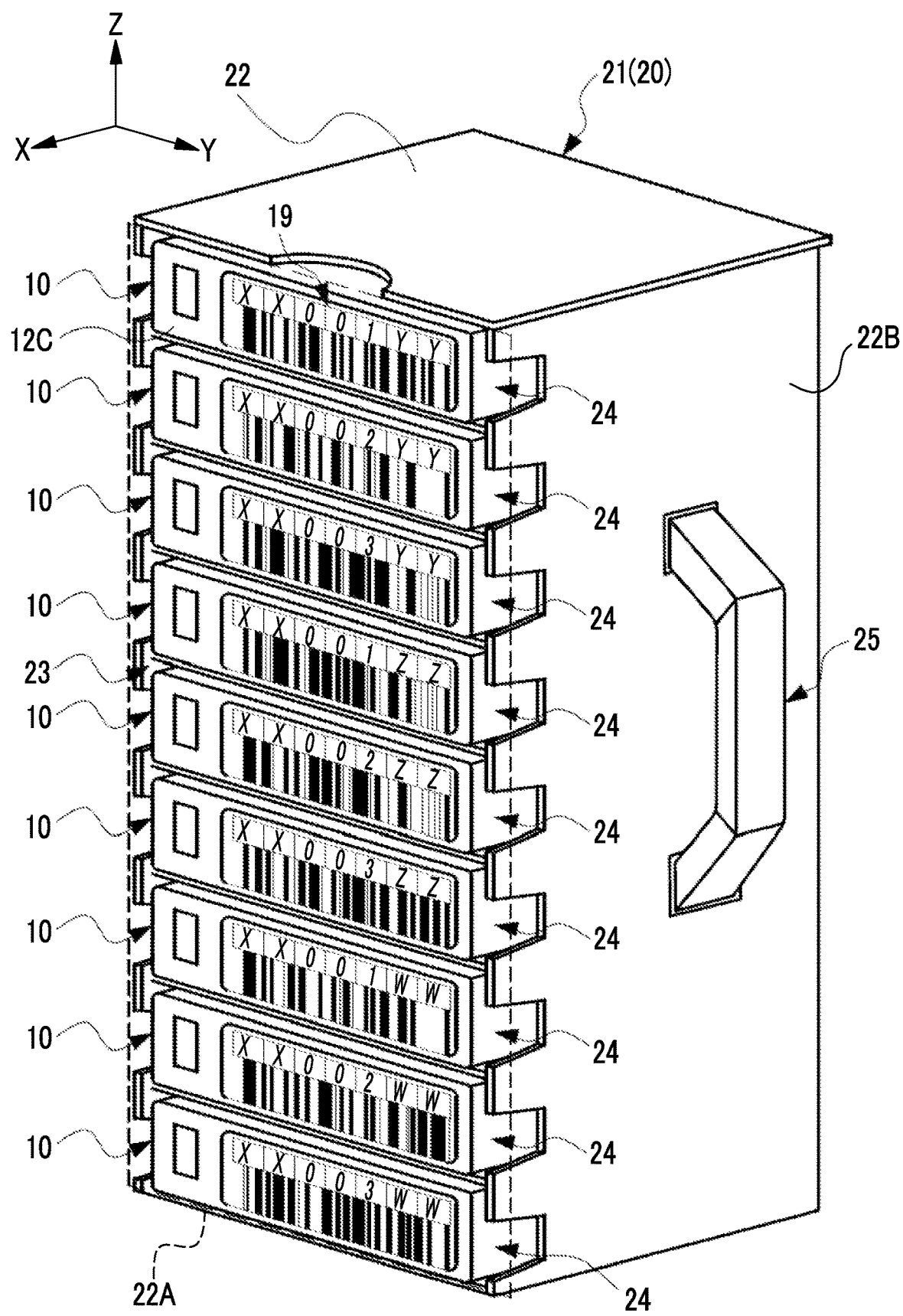
FIG. 11 is a schematic perspective view showing an example of the appearance of a cartridge magazine according to a modification example.

As shown in FIG. 11 as an example, the opening portion 23 is formed in the front surface 22A in the housing structure 22 of the storage member 20. In addition, the gripping portion 25 is provided on the right surface 22B adjacent to the front surface 22A in the housing structure 22. The front surface 22A is an example of a "first surface" according to the technique of the present disclosure, and the right surface 22B is an example of a "second surface" according to the technique of the present disclosure.

The gripping portion 25 is provided at the center of the right surface 22B in the housing structure 22. In the example shown in FIG. 11, the gripping portion 25 is a grip that has an upper end and a lower end attached to the housing structure 22 and that is configured such that an intermediate portion can be gripped. The user moves the storage member 20 through the gripping portion 25. The user can visually recognize the identifier 19 of the magnetic tape cartridge 10 stored in the storage member 20 from the front surface 22A side in a state of gripping the gripping portion 25.

As described above, in the package 60 according to the present modification example, the gripping portion 25 is provided on the right surface 22B adjacent to the opening portion 23 in the storage member 20. Therefore, according to this configuration, the magnetic tape cartridge 10 is easily identified. For example, the user easily identifies the magnetic tape cartridge 10 in a state of gripping the gripping portion, compared to a case where the gripping portion 25 is on a surface (that is, a rear surface) opposite to the front surface 22A in which the opening portion 23 is provided, in the storage member 20.

In the present modification example, although a form example where the gripping portion 25 is provided on the right surface 22B has been described, the technique of the present disclosure is not limited thereto. The gripping portion 25 may be provided on a left surface or may be provided on a top surface, in the housing structure 22.

Modification Example 4

In the above-described embodiment, although a form example where the barcode 19A is displayed as the identifier 19 has been described, the technique of the present disclosure is not limited thereto. In Modification Example 4, a two-dimensional matrix image 19C is displayed as the identifier 19 instead of the barcode 19A.

Figure 12:
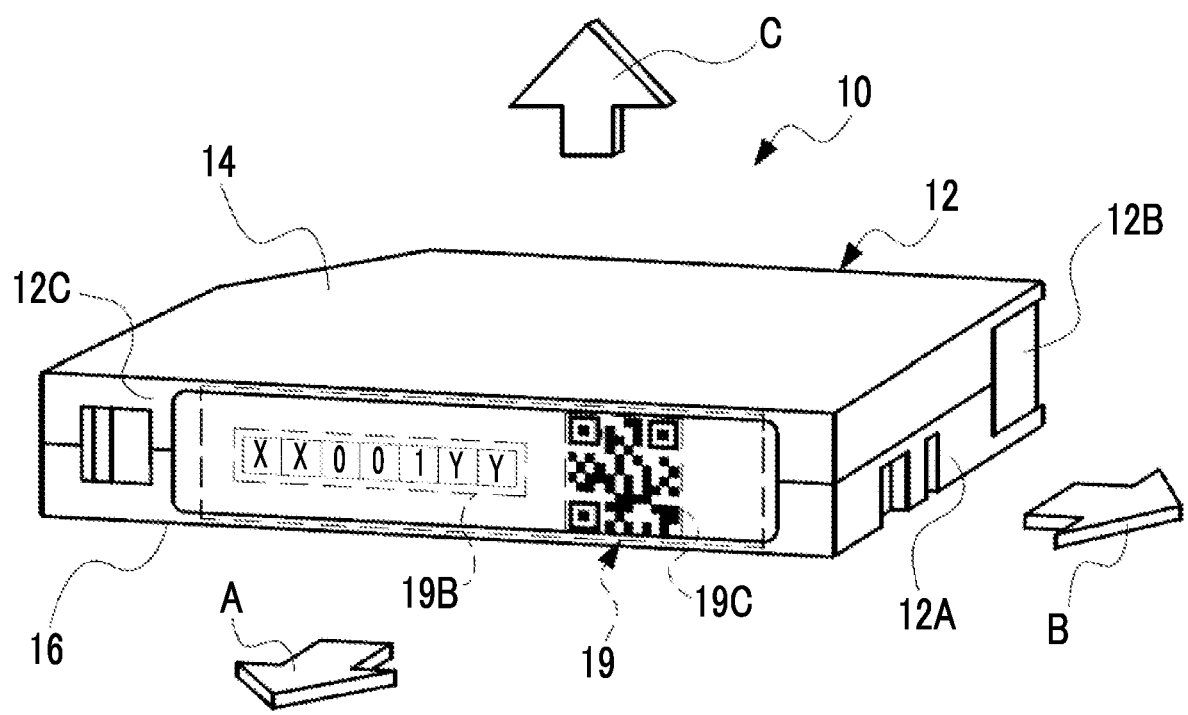
FIG. 12 is a schematic perspective view showing an example of an identifier displayed on a magnetic tape cartridge according to a modification example.

As shown in FIG. 12 as an example, the identifier 19 is displayed on the surface of the case 12 of the magnetic tape cartridge 10. In the example shown in FIG. 12, the identifier 19 is displayed on the surface of the front wall 12C of the case 12. The identifier 19 includes the two-dimensional matrix image 19C. The two-dimensional matrix image 19C is a two-dimensional image indicating information for identifying the magnetic tape cartridge 10 (for example, a serial number for managing the magnetic tape cartridge 10, given by the user). The two-dimensional matrix image 19C is an example of a "two-dimensional matrix image" according to the technique of the present disclosure.

As described above, in the package 60 according to the present modification example, the identifier 19 includes the two-dimensional matrix image 19C. Therefore, according to this configuration, the magnetic tape cartridge 10 is easily identified. For example, the magnetic tape cartridge 10 is easily identified, compared to a case where the identifier 19 is composed only of a character string.

In the present modification example, although a form example where the identifier 19 includes the two-dimensional matrix image 19C has been described, the technique of the present disclosure is not limited thereto. For example, an aspect where the identifier 19 includes the barcode 19A along with the two-dimensional matrix image 19C may be made. An aspect where the identifier 19 includes a dot code instead of the two-dimensional matrix image 19C and the barcode 19A or along with the two-dimensional matrix image 19C and the barcode 19A may be made.

In the above-described embodiment and each modification example, although a form example where the storage member 20 is the cartridge magazine 21 has been described, the technique of the present disclosure is not limited thereto. For example, the storage member 20 may be a dedicated housing for transporting the magnetic tape cartridge 10.

In the above-described embodiment and each modification example, although a form example where the storage member 20 comprises a plurality of storage portions 24 in the up-down direction (that is, the Z-axis direction shown in FIG. 3 or the like) has been described, the technique of the present disclosure is not limited thereto. A form in which the storage member 20 comprises a plurality of storage portions 24 in a right-left direction (that is, the Y-axis direction shown in FIG. 3 or the like) as well as the up-down direction.

In the above-described embodiment and each modification example, although a form example where the magnetic tape cartridges 10 are stored in all of a plurality of storage portions 24 has been described, the technique of the present disclosure is not limited thereto. An aspect where the magnetic tape cartridges 10 are stored in a part of a plurality of storage portions 24 may be made. In this case, the packaging member 61 does not need to cover the whole of the opening portion 23, and may cover a region corresponding to the storage portions 24 where the magnetic tape cartridges 10 are stored, in the opening portion 23.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A package comprising:
a magnetic tape cartridge that has a case with an identifier displayed on a front surface;
a storage member that has an opening portion, through which the magnetic tape cartridge is put in and out, and in which the magnetic tape cartridge is stored in a state in which the identifier is readable; and
a packaging member that covers at least the opening portion of the storage member, wherein:
the storage member is a magazine for a magnetic tape cartridge formed to be inputtable into a magnetic tape library,
the package comprises a plurality of magnetic tape cartridges,
the storage member has a plurality of storage portions that respectively store the plurality of magnetic tape cartridges, and
the packaging member is a film-shaped member and covers all of the opening portion of the plurality of storage portions of the storage member.

2. The package according to claim 1,
wherein the packaging member is formed to be attachable and detachable with respect to the storage member.

3. The package according to claim 1,
wherein the packaging member covers the storage member in a state in which the identifier is readable.

4. The package according to claim 3,
wherein the packaging member is formed of a material that transmits visible light.

5. The package according to claim 1,
wherein the identifier is displayed on a surface of the case on an opening portion side.

6. The package according to claim 1,
wherein the identifier includes a one-dimensional image and/or a two- dimensional matrix image.

7. The package according to claim 1,
wherein the storage member has
a first surface where the opening portion is formed, and
a second surface that is adjacent to the first surface and where a gripping portion is provided.

8. A packaging method comprising:
inserting a magnetic tape cartridge having a case with an identifier displayed on a front surface, from an opening portion, to store the magnetic tape cartridge in a storage member in a state in which the identifier is readable, wherein the storage member is a magazine, for a magnetic tape cartridge formed to be inputtable into a magnetic tape library, and has a plurality of storage portions that respectively store a plurality of magnetic tape cartridges; and
covering all of the opening portion of the plurality of the storage portions of the storage member with a packaging member that is a film-shaped member.

* * * * *